(12) United States Patent
Wang et al.

(10) Patent No.: US 11,107,220 B2
(45) Date of Patent: Aug. 31, 2021

(54) IMAGE PROCESSING SYSTEM AND IMAGE PROCESSING METHOD

(71) Applicant: HTC Corporation, Taoyuan (TW)

(72) Inventors: Jen-Chun Wang, Taoyuan (TW);
Chun-Li Wang, Taoyuan (TW);
Tung-Ting Yang, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 45 days.

(21) Appl. No.: 16/713,220

(22) Filed: Dec. 13, 2019

(65) Prior Publication Data
US 2021/0183065 A1 Jun. 17, 2021

(51) Int. Cl.
*G06T 7/00* (2017.01)
*G06T 7/11* (2017.01)
*G06T 5/20* (2006.01)
*G06N 3/04* (2006.01)

(52) U.S. Cl.
CPC ............. *G06T 7/11* (2017.01); *G06N 3/0454* (2013.01); *G06T 5/20* (2013.01); *G06T 2207/10024* (2013.01); *G06T 2207/20084* (2013.01)

(58) Field of Classification Search
CPC ... G06T 7/11; G06T 5/20; G06T 2207/10024; G06T 2207/20084; G06N 3/0454
See application file for complete search history.

(56) References Cited

U.S. PATENT DOCUMENTS

2018/0253636 A1* 9/2018 Lee .................. G06N 3/063
2020/0357143 A1* 11/2020 Chiu ................. G06K 9/629

FOREIGN PATENT DOCUMENTS

CN    199920012 A    6/2019
CN    110390724 A    10/2019

OTHER PUBLICATIONS

Dai et al Instance-aware Semantic Segmentation via Multi-task Network Cascades, CVF: CVPR paper, p. 3150-3158 (Year: 2016).*

* cited by examiner

*Primary Examiner* — Ping Y Hsieh
*Assistant Examiner* — Xiao Liu
(74) *Attorney, Agent, or Firm* — Birch, Stewart, Kolasch & Birch, LLP

(57) ABSTRACT

An image processing method includes the following steps: receiving a two-dimensional image and segmenting an object block in the two-dimensional image, masking the object block with a color block to generate a mask image; inputting the two-dimensional image and the mask image into a first image processing model, outputting a feature vector from the first image processing model; and inputting the two-dimensional image into a second image processing model to obtain a feature map. The feature map comprises a plurality of feature channel maps, and the feature vector contains a plurality of feature values. Each of the feature channel maps corresponds to one of the feature values in sequence. A weighted feature map is generated according to the feature channel maps and the feature values.

10 Claims, 4 Drawing Sheets

IMAGE PROCESSING SYSTEM AND IMAGE PROCESSING METHOD

BACKGROUND OF THE INVENTION

Field of the Invention

The present disclosure relates to a processing system and, in particular, to an image processing system and an image processing method.

Description of the Related Art

In general, a two-dimensional image can be segmented using a known model, such as a convolutional neural network (CNN) model, to segment multiple objects in a two-dimensional image. Moreover, each object is assigned a different color to output a color block map. The position and block of each object in the two-dimensional image can be known from the color block map. After determining the distribution position and block of the object, a known three-dimensional reconstruction method can be performed, such as Shape From Texture (SFT), Shape From Shading, and Multi-View Stereo, Structured Light, etc., to construct a three-dimensional object. These three-dimensional objects can play an auxiliary role in research, such as the protection of cultural relics, game development, architectural design, and clinical medicine.

However, types of objects learnt by the system in advance for distinguishing are limited. Therefore, when object images are segmented from a two-dimensional image, the system may not be able to accurately identify what an object is, or the shape of the object may be difficult to distinguish. For example, it is difficult for the system to accurately determine whether the specific object is a door or a window. Moreover, it is also difficult to distinguish a seat with an artistic shape.

Therefore, how to make the system accurately and efficiently identify specific objects has become one of the problems to be solved in the field.

BRIEF SUMMARY OF THE INVENTION

In accordance with one feature of the present invention, the present disclosure provides an image processing system. The image processing system includes a processor. The processor is configured to receive a two-dimensional image and to segment an object block in the two-dimensional image, mask the object block with a color block to generate a mask image, and input the two-dimensional image and the mask image into a first image processing model. The first image processing model outputs a feature vector. Moreover, the processor inputs the two-dimensional image into a second image processing model to obtain a feature map. The feature map includes a plurality of feature channel maps, and the feature vector contains a plurality of feature values, each of the feature channel maps corresponds to one of the feature values in sequence, and the processor generates a weighted feature map according to the feature channel maps and the feature values.

In accordance with one feature of the present invention, the present disclosure provides an image processing method. The image processing method includes the following steps: receiving a two-dimensional image and segmenting an object block in the two-dimensional image, masking the object block with a color block to generate a mask image; inputting the two-dimensional image and the mask image into a first image processing model, outputting a feature vector from the first image processing model; and inputting the two-dimensional image into a second image processing model to obtain a feature map. The feature map comprises a plurality of feature channel maps, and the feature vector contains a plurality of feature values, each of the feature channel maps corresponds to one of the feature values in sequence, and a weighted feature map is generated according to the feature channel maps and the feature values.

In summary, the embodiments of the present invention provide an image processing system and an image processing method. The application of weighted feature maps can enhance the features of object blocks, making the color block map output by the second image processing model (the image processing model ENT) more accurate. The position and category of each object block (such as chair and closet) in the two-dimensional image can be accurately determined. In addition, when the processor receives the two-dimensional image of the field once processed again, the processor can directly retrieve the feature vector calculated by the previous first image processing model (the image processing model ENR) from the storage device, without recalculating the feature vector when receiving a similar two-dimensional image each time. Moreover, it is not necessary to apply the previous layer calculation results of the feature map to calculate the weighted feature map. Therefore, the image processing system and the image processing method of the present invention achieve a more efficient and accurate image labeling effect.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "comprises" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
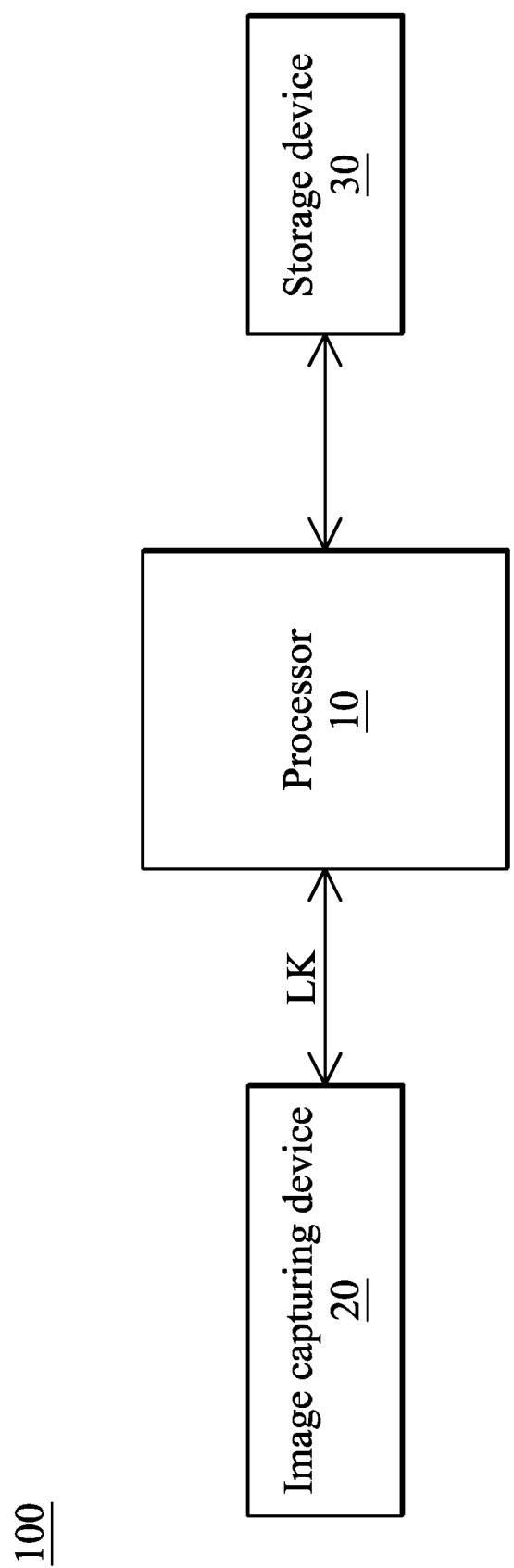
FIG. 1 is a schematic diagram of an image processing system in accordance with one embodiment of the present disclosure.
Figure 2:
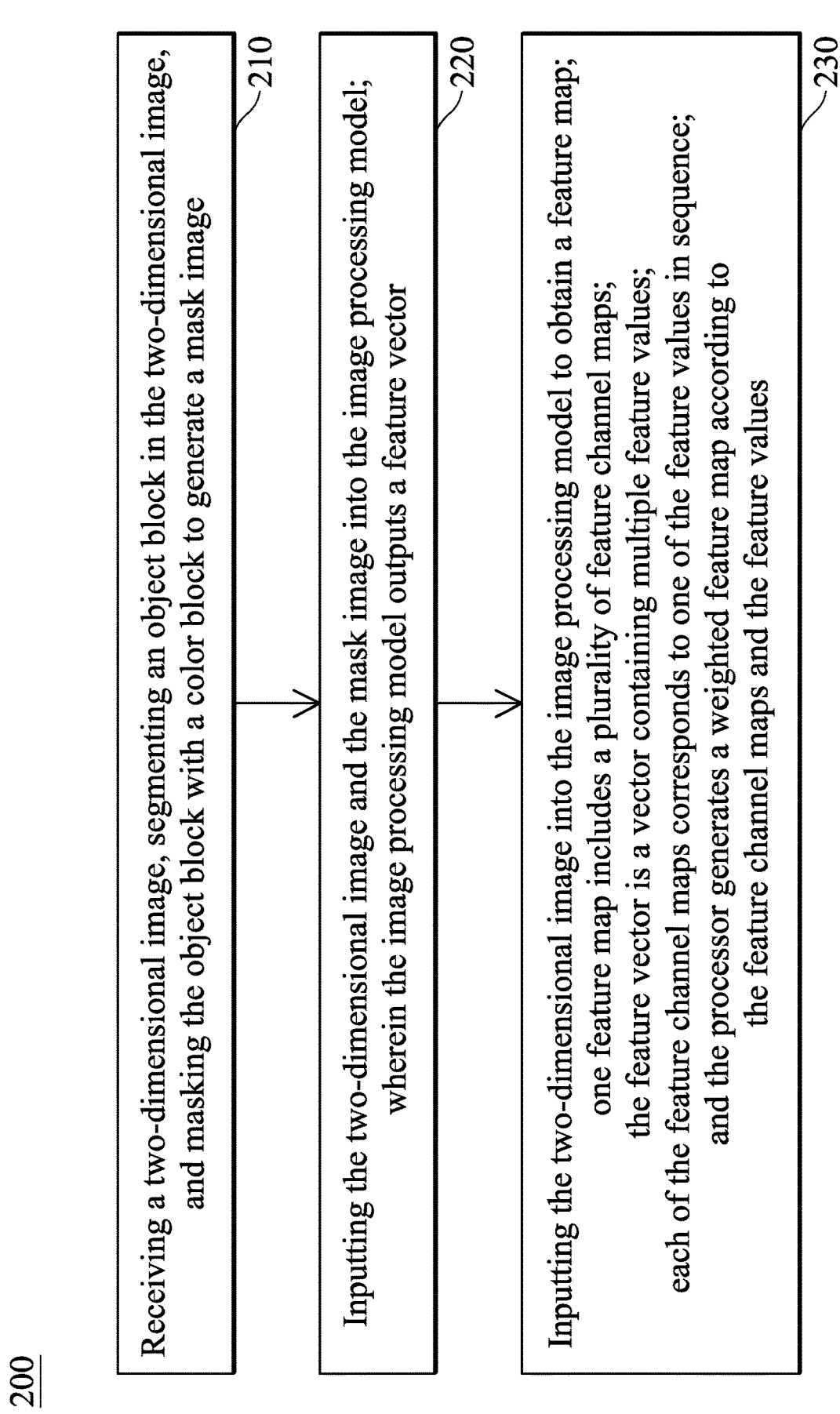
FIG. 2 is a flowchart of an image processing system in accordance with one embodiment of the present disclosure.
Figure 3:
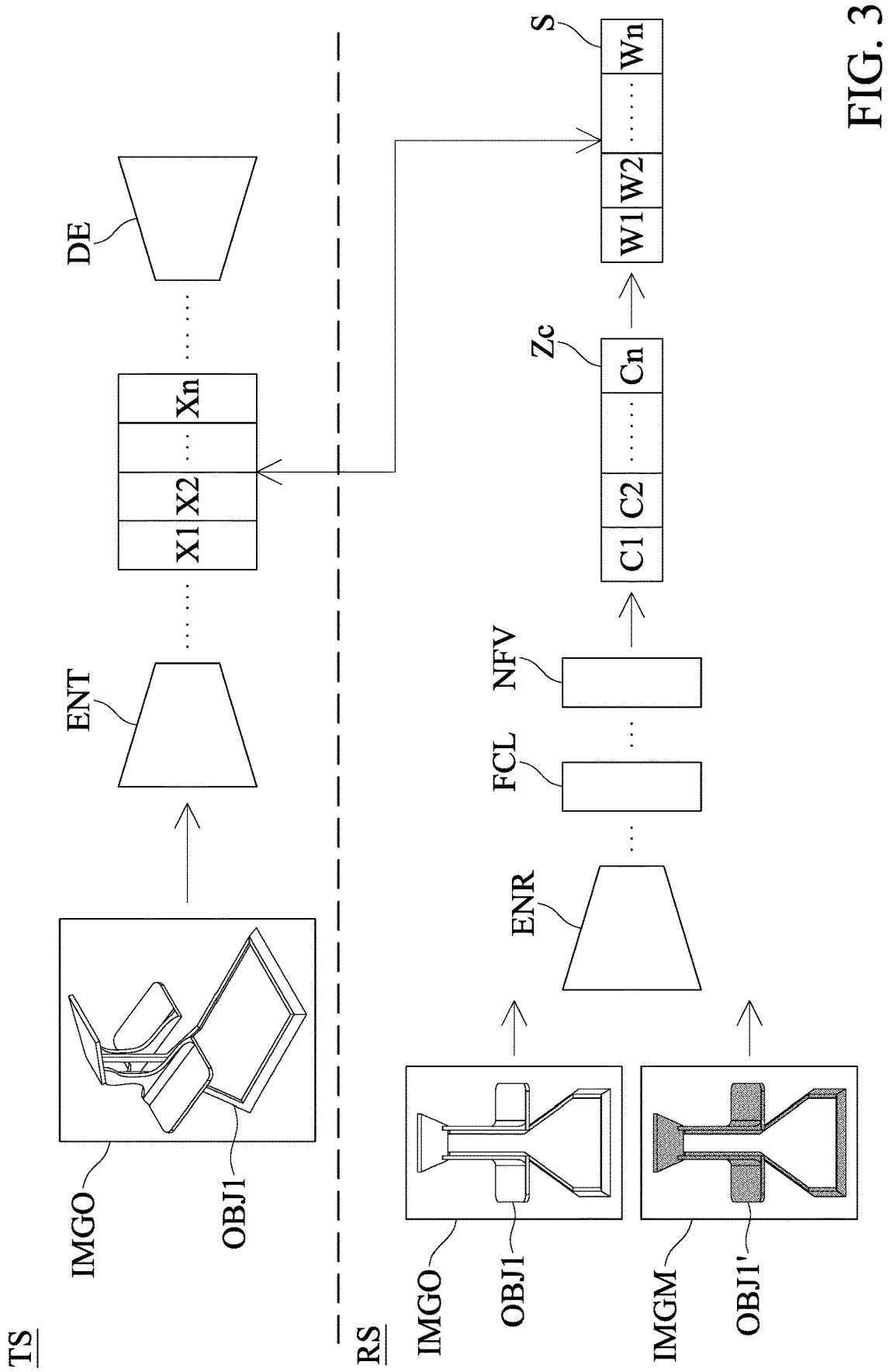
FIG. 3 is a schematic diagram of an image processing method in accordance with one embodiment of the present disclosure.

Please refer to FIGS. 1-5, FIG. 1 is a schematic diagram of an image processing system 100 in accordance with one embodiment of the present disclosure. FIG. 2 is a flowchart of an image processing method 200 in accordance with one embodiment of the present disclosure. FIG. 3 is a schematic diagram of an image processing method in accordance with one embodiment of the present disclosure. FIG. 4A is a schematic diagram of an input image IMGA in accordance with one embodiment of the present disclosure. FIG. 4B is a schematic diagram of a color block map IMGB in accordance with one embodiment of the present disclosure. FIG. 4C is a schematic diagram of an adjusted mask color map IMGC in accordance with one embodiment of the present disclosure.

In one embodiment, the image processing system 100 can be applied to identify portion of an object in a virtual reality system. In one embodiment, the image processing system 100 includes a processor 10. In one embodiment, the image processing system 100 further includes an image capturing device 20 and a storage device 30. The processor 10 is electrically coupled to the storage device 30. The processor 10 and the image capturing device 20 establish a communication link LK in a wired or wireless manner.

In one embodiment, the processer 10 can be any electronic device having a calculation function. The processer 14 can be implemented using an integrated circuit, such as a microcontroller, a microprocessor, a digital signal processor, an application specific integrated circuit (ASIC), or a logic circuit.

In one embodiment, the storage device 30 can be implemented as a read-only memory, a flash memory, a floppy disk, a hard disk, an optical disk, a flash drive, a magnetic tape, a database accessible by network, or a person skilled in the art can easily think of storage media with the same features.

In one embodiment, the image capturing device 20 can be an augmented reality (AR) glasses.

Generally, by inputting an image to the convolutional neural networks (CNN) model, the result of which category the image belongs to can be obtained. This process is called as classification. However, in real-world application scenarios, it is common to identify all objects that appear from a picture and mark location of the objects (Object Localization). This can be used for graph-based image segmentation through CNN model, R-CNN (Regions with CNN) model or other algorithms that can be applied to segment the images.

In one embodiment, the processor 10 applies a scene segmentation model to separate the object blocks in the two-dimensional image and color the object blocks. The scene segmentation model can be implemented by CNN model, R-CNN (Regions with CNN) model or other algorithms that can be applied to segment the images. However, those skilled in the art should understand that the present invention is not limited to apply CNN models, as long as other neural network models that can achieve scene segmentation.

For example, when the processor 10 applies the CNN model to analyze an indoor image, the CNN model identifies the probabilities of 15 objects (such as bed, wall, closet, window, mop . . . , etc.) appear in each block of the indoor image. For example, the recognition result shows the probabilities of a certain block being one of 15 objects: i.e., the probability of the block being a bed is 10%, the probability of the block being a wall is 20%, the probability of the block being a closet is 90% . . . , etc. The most likely object corresponding to the block with respect to these probabilities is a closet. Thus, the block is regarded as a closet. In one embodiment, the processor 10 generates a color block map according to these probabilities. Each color block in the color block map represents an object. For example, the block above (the block determined to be a closet) is colored red.

In one embodiment, after segmenting each object in the image, the processor 10 performs a three-dimensional reconstruction of the object block to produce a three-dimensional object. For example, the processor 10 performs the three-dimensional reconstruction of the closet block colored red, so as to generate a three-dimensional reconstructed image of the closet for subsequent use by the application. The three-dimensional reconstruction method can implement known algorithms, such as Shape From Texture (SFT), Shape From Shading, Multi-View Stereo, and Structured Light . . . and so on. These known algorithms are not detailed here.

In order to further improve the accuracy of identifying objects in the image, the user can mark the objects in the image or adjust the results identified by the CNN model. For example, when a user wears augmented reality glasses, the augmented reality glasses identify at least one hotspot in the viewing field corresponding to a pupil gaze angle. The augmented reality glasses mark multiple perspective hotspots on the two-dimensional image captured by augmented reality glasses to generate a hotspot map, or the augmented reality glasses transmit multiple perspective hotspots to the processor 10 for generating the hotspot map by the processor 10. In one embodiment, the processor 10 inputs a hotspot map and a two-dimensional image into a CNN model to identify the object blocks of the two-dimensional image. Moreover, the processor 10 colors the object blocks to generate a color block map. Since not only a two-dimensional image is input to the CNN model, but also the hotspot map is input to the CNN model, the position and shape of the object block identified by the CNN model can be made more accurate.

In one example, the augmented reality glasses or other prompting devices (e.g., earphones) can prompt the user to watch a specific object (e.g., the augmented reality glasses display "Please watch the closet" and for the earphones send the audio prompt "Please watch closet"). Then, the user will look in the direction of the closet. The augmented reality glasses thus obtain the perspective hotspots corresponding to the closet, and generate a hotspot map based on at least one perspective hotspot (the augmented reality glasses can also transmit at least one perspective hotspot to the processor 10, and the processor 10 generates a hotspot map).

Therefore, when the hotspot map and the two-dimensional image are input into the CNN model, the position and shape of the object block (i.e., the image block corresponding to the closet) identified by the CNN model can be made more accurate.

In one embodiment, the display screen of the display of the augmented reality glasses includes a menu, a red block (that is, a color block corresponding to the image block of the closet), and an indicator signal. Users can selectively focus on specific signs (such as closet) in menus (for example, the options in the menu include closet, walls, and doors). After the augmented reality glasses recognize the user's perspective, the indicator signal can be moved to the closet option on the menu. In addition, the user can also select a closet option on the menu through a controller, thereby adjusting or confirming that the red block is marked as a closet. Therefore, in addition to labeling the object block through the CNN model, through the auxiliary labeling by the user in the above manner, the effect of accurately labeling the object block can be achieved.

Please refer to FIGS. 2-3. In FIG. 3, the two-dimensional image IMGO can be the original image captured by the image capturing device 20. The mask image IMGM is a specific object image that is separated from the two-dimensional image IMGO after the two-dimensional image IMGO is input into a CNN model (or other model that can be used for segmentation), and the specific object image is labeled with a CNN model or by user assistance. This specific object image is colored, for example, red, to output the mask image IMGM.

In one embodiment, both the two-dimensional image IMGO and the mask image IMGM are collectively referred to as ground truth. In machine learning, the ground truth refers to the process of collecting appropriate target data (the data for proving correctness) for this test.

In one embodiment, the masked image IMGM may be a labeled image. The labeling method may be labeled through a CNN model, or a user may assist in labeling by the above manner. However, the labeling method is not limited thereto.

The image processing method 200 applies the extracted image features so that the image processing model can more accurately identify each object in the image. Each step of the image processing method 200 is described below. As shown in FIG. 3, the image processing method 200 can be divided into two sub-steps operating in parallel or one after another, one of which is a target stream TS and another is a reference stream RS.

In step 210, the processor 10 receives a two-dimensional image IMGO, segments an object block OBJ1 in the two-dimensional image IMGO, and masks the object block OBJ1 with a color block to generate a mask image IMGM.

In one embodiment, the processor 10 applies a scene segmentation model to separate the object block OBJ1 in the two-dimensional image IMGO, and colors the object block OBJ1 to generate a mask image IMGM. In other words, the mask image IMGM includes a color block OBJ1' corresponding to the object block OBJ1.

In step 220, the processor 10 inputs the two-dimensional image IMGO and the mask image IMGM into the image processing model ENR, and the image processing model ENR outputs a feature vector S.

In one embodiment, the processor 10 receives the two-dimensional image IMGO and the mask image IMGM when performing the reference stream RS step. Moreover, the processor 10 inputs the two-dimensional image IMGO and the mask image IMGM into the image processing model ENR.

In one embodiment, the image processing model ENR is implemented by a CNN model. The processor 10 executes a series of algorithms in the image processing model ENR: after inputting the two-dimensional image IMGO and the mask image IMGM into the CNN model, the CNN model will sequentially perform the operations of a convolution layer, a ReLU layer, a convolution layer, a ReLU layer, a pooling layer, a ReLU layer, a convolution layer, a ReLU layer, pooling layer, and a fully connected FCL. However, the operation of each layer in the CNN model can be adjusted to meet the specific needs of its practical implementation, and it is not limited thereto.

In one embodiment, the input layer of the fully connected layer FCL may come from the output of the convolution layer, the ReLU layer, or the pooling layer. The output is an N-dimensional vector, and the size of N corresponds to the number of categories (for example, 15 categories). The fully connected layer FCL can be regarded as a classifier in the CNN model. If the convolutional layer, pooling layer, and ReLU layer are regarded as the feature space that maps the original data to the hidden layer, the fully connected layer FCL can be regarded as mapping the learned distributed feature representation value to the sample label space. In actual use, the fully connected layer FCL can be implemented by a convolution algorithm. For a current fully connected layer FCL that the previous layer is a fully connected layer FCL, the fully connected layer current FCL can be converted into a convolution kernel with a convolution kernel of 1*1. For the fully connected layer FCL that the previous layer is a convolution layer, the fully connected layer FCL can be converted into a global convolution NFV with a convolution kernel of h*w. The notations h and w separately are the height and width of the convolution result of the previous layer, and the global convolution NFV can be converted into 1*1*n (n is the length) of the global information Zc by the global average pooling algorithm. The global information Zc contains a plurality of extracted characteristic information Cl-Cn. The global information Zc is reduced by operations such as the sigmoid function and the ReLU layer to generate a feature vector S with the same dimensions. The feature vector S is used as a set of weights to describe the feature map FM. Each weight corresponds to a feature value.

In one embodiment, the feature vector S includes a plurality of feature values W1-Wn. The feature values W1-Wn represent the weights corresponding to multiple features of the two-dimensional image IMGO. The feature values W1-Wn represent, for example, containing the weights of the features (straight or oblique lines) representing the sides, the weight of shape of the vertical seat back, the weight of the sofa plush, etc. The feature values W1-Wn can include weights from low-level features (more specific) to high-level features (more abstract).

In one embodiment, the storage device 30 stores the feature values W1-Wn.

It can be known from the above that the feature vector S can be calculated offline or online and stored in the storage device 30. When the processor 10 can process another two-dimensional image in the same field (such as the same scene) or similar (such as when another two-dimensional image containing more than 80% of the pixels is the same as the two-dimensional image IMGO) again, the processor 10 can directly obtain the feature vector S corresponding to the two-dimensional image IMGO from the storage device 30 for calculation.

In one embodiment, the object block OBJ1 in the two-dimensional image IMGO input to the image processing model ENT and the object block OBJ1 in the two-dimensional image IMGO input to the image processing model ENR can be the same object with different perspectives. For example, the object block OBJ1 in the two-dimensional image IMGO input to the image processing model ENT is a left-view image of the chair, and the object block OBJ1 in the two-dimensional image IMGO input to the image processing model ENR is a front-view image of the chair.

In one embodiment, the two-dimensional image IMGO of the reference stream RS has the same perspective as the mask image IMGM of the reference stream RS.

In step 230, the processor 10 inputs the two-dimensional image IMGO into the image processing model ENT to obtain a feature map FM. One feature map FM includes a plurality of feature channel maps X1-Xn. The feature vector S is a vector containing multiple feature values W1-Wn. Each of the feature channel maps X1-Xn corresponds to one of the feature values W1-Wn in sequence. The processor 10 generates a weighted feature map according to the feature channel maps X1-Xn and the feature values W1-Wn.

In one embodiment, the processor 10 receives the two-dimensional image IMGO when performing the steps of the target stream TS, and inputs the two-dimensional image IMGO into the image processing model ENT.

In one embodiment, the image processing model ENT is implemented by another CNN model.

In one embodiment, the image processing model ENT can be referred to as an encoder, which is used to reduce the two-dimensional image IMGO (original image) through a series of algorithms, and extract features and enhance the extracted features.

In one embodiment, the processor 10 obtains a first result after executing a convolution operation in the image processing model ENT, and adds the first result to an activation function, such as a sigmoid function, a tan h function, or a ReLU function, to obtain a second result. And then, the processor 10 performs a non-linear transformation on the second result. The resulting image is called a feature map FM.

In one embodiment, the image processing model DE can be referred to as a decoder for restoring an image according to the enhanced extracted features. The restored image can be a color block map of a two-dimensional image IMGO.

In one embodiment, the processor 10 sequentially multiplies each of the feature channel maps X1 to Xn by the corresponding feature values W1 to Wn, to output a weighted feature map. For example, feature channel map X1 (feature channel map related to triangular features) is 1, feature channel map X2 (feature channel map related to linear features) is 2, and feature channel map X3 (feature channel map related to the shape of the vertical seat back) is 3; feature value W1 is 0.8, feature value W2 is 0.2, and feature value W3 is 0.1. The feature channel map X1 is multiplied by the feature value W1 to obtain a weighted feature 0.8. The feature channel map X2 is multiplied by the feature value W2 to obtain a weighted feature 0.4. The feature channel map X3 is multiplied by the feature value W3 to obtain a weighted feature 0.3, After all n weighted features are calculated, the set of all weighted features is considered as a weighted feature map.

It can be seen that the importance of each feature channel map X1 to Xn can be adjusted through the feature values W1 to Wn. In other words, the higher the weighted feature in the weighted feature map, the more obvious or important the corresponding feature is. The lower weighted feature means that the corresponding feature is less obvious or unimportant.

In one embodiment, a series of operations in the image processing model ENR can correspond to a series of operations performed by the image processing model ENT. At this time, the image processing model ENR and the image processing model ENT calculate the same number of layers. The processor 10 can extract the processing result of one or more layers (such as the first layer operation and the fifth layer operation) as an intermediate feature weight during the processing of the image processing model ENR. The multiple intermediate feature maps of the image processing model ENR are each multiplied by the processing results of the corresponding processing layers of the image processing model ENT (such as the first layer operation and the fifth layer operation). The results obtained after multiplication can be regarded as other weighted feature maps. It can increase the amount of multiple weighted feature maps. Using multiple weighted feature maps, the weight of each layer of image features can be redistributed.

Based on above, the feature vector S can be used to apply the feature values W1-Wn to increase the obvious features when the features of the image are obvious. For example, when the chair contains the triangle feature, the feature value (for example, the feature value W2) of the feature vector S that is related to the triangle feature will be larger (for example, 0.8). Other insignificant features are lower (for example, the feature value related to the straight line feature is 0.2, and the feature value related to the shape of the vertical seat back is 0.1). After the processor 10 multiplies the feature value W2 by the feature value of the triangle feature, the triangle feature is weighted by the feature value W2 and becomes prominent.

In one embodiment, when the processor 10 inputs the two-dimensional image IMGO into the image processing model ENT again to obtain the feature map FM, the process 10 directly accesses the feature values W1-Wn corresponding to the two-dimensional image IMGO in the storage device 30. The processor 10 sequentially multiplies each feature value W1-Wn by each feature channel map X1-Xn in order to output a weighted feature map.

Figure 4C:
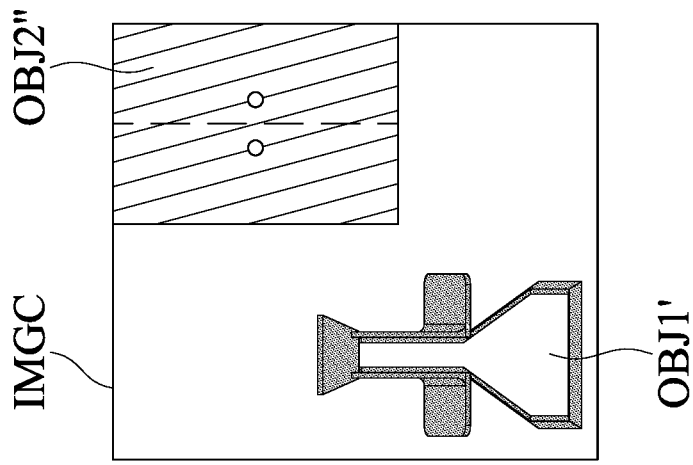
FIG. 4C is a schematic diagram of an adjusted mask color map in accordance with one embodiment of the present disclosure.
Figure 4B:
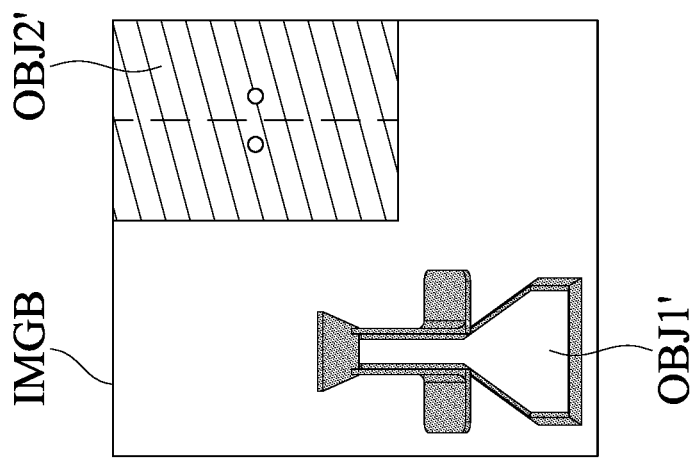
FIG. 4B is a schematic diagram of a color block map in accordance with one embodiment of the present disclosure.
Figure 4A:
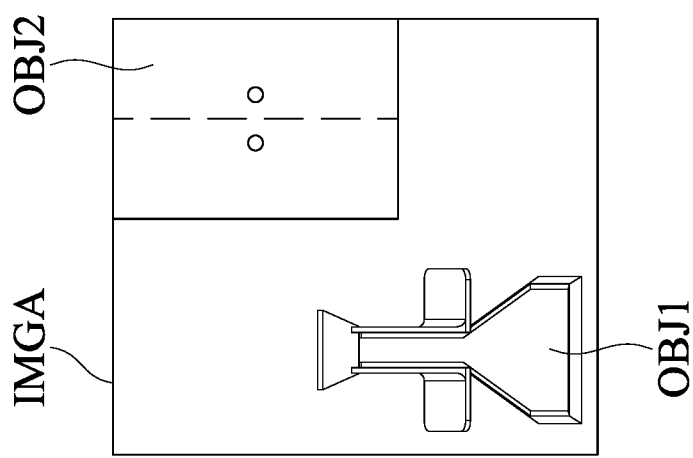
FIG. 4A is a schematic diagram of an input image in accordance with one embodiment of the present disclosure.

Please refer to FIG. 4A, when the processor 10 receives a two-dimensional image IMGA (for example, an RGB original image), the processor 10 uses a CNN model to separate the object blocks OBJ1 and OBJ2 in the two-dimensional image IMGA. Moreover, the object block OBJ1 is initially classified as a chair through the CNN model (at this time, the CNN model is correctly classified). The object block OBJ2 is initially classified as a window through the CNN model (at this time, the CNN model is misclassified, the object block OBJ2 is actually a closet).

Next, the processor 10 applies color blocks of different colors to mask the object blocks OBJ1 and OBJ2 to generate a mask image IMGB (as shown in FIG. 4B). The colored object block OBJ1 in FIG. 4A corresponds to the color block OBJ1' in FIG. 4B (for example, the color block OBJ1' is red, which represents a chair block). The colored object block OBJ2 in FIG. 4A corresponds to the color block OBJ2' in FIG. 4B (for example, the color block OBJ2' is purple, which represents a window block). It can be known that the image processing system 100 generates a mask for the segmented object block. However, the coloring described here is only for the convenience of the human eye to confirm whether the mask position calculated by the image processing system 100 is correct. For example, the human eye can perceive the position of the color block OBJ1' to confirm whether the chair block is properly masked. Therefore, coloring is an optional step, and the color used for each object block is not limited thereto. The above is only provided as an example.

Next, the processor 10 inputs the two-dimensional image IMGA into the image processing model ENT, and calculates a feature map FM through the image processing model ENT. Because in a similar shooting field, the processor 10 obtains the feature vector S of the corresponding object block OBJ1 from the storage device 30. Moreover, the processor 10 multiplies each feature value W1-Wn in the feature vector S by each feature channel map X1-Xn sequentially to obtain a weighted feature map. Therefore, when the image processing model DE outputs the adjusted mask color block map IMGC according to the weighted feature map, as shown in FIG. 4C, the color block OBJ1' is still red, which represents the chair block.

On the other hand, assuming that the object block OBJ2 has also calculated the feature vector S of the corresponding object block OBJ2 when offline, the processor 10 obtains the feature vector S corresponding to the object block OBJ2 from the storage device 30, and sequentially multiplies each feature value in the feature vector S by each feature channel map to obtain a weighted feature map. The weighted feature map can make the features of the object block OBJ2 prominent. Therefore, when the image processing model DE outputs the adjusted mask color block map IMGC according to the weighted feature map, the image processing model DE instead determines that the object block OBJ2 is a closet (rather than the window judged initially) based on the weighted feature map. As shown in FIG. 4C, the image processing model DE outputs a color block OBJ2" corresponding to the object block OBJ2 to orange, which represents the closet block.

Therefore, by applying the weighted feature map, it can enhance the features of the object blocks OBJ1 and OBJ2 and make the adjusted mask color block map IMGC more accurate. The positions and categories (such as chair and closet) of each object block OBJ1, OBJ2 in the two-dimensional image IMGA can be accurately determined.

In one example, since the feature vector S can be calculated in offline and usually the chair in the same room or field are the same, when the processor 10 receives an image which is similar with two-dimensional image IMGO, and after calculating the feature map FM of the image through the image processing model ENT, the processor 10 can retrieve the feature vector S corresponding to the two-dimensional image IMGO from the storage device 30. The processor 10 does not need to recalculate the feature vector S every time when it receives the two-dimensional image IMGO or the image which is similar with two-dimensional image IMGO again. The processor 10 also does not need to apply the calculation result of the previous layer of the feature map FM to calculate the weighted feature map.

In summary, the embodiments of the present invention provide an image processing system and an image processing method. The application of weighted feature maps can enhance the features of object blocks, making the color block map output by the second image processing model (the image processing model ENT) more accurate. The position and category of each object block (such as chair and closet) in the two-dimensional image can be accurately determined. In addition, when the processor receives the two-dimensional image of the field once processed again, the processor can directly retrieve the feature vector calculated by the previous first image processing model (the image processing model ENR) from the storage device, without recalculating the feature vector when receiving a similar two-dimensional image each time. Moreover, it is not necessary to apply the previous layer calculation results of the feature map to calculate the weighted feature map. Therefore, the image processing system and the image processing method of the present invention achieve a more efficient and accurate image labeling effect.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. An image processing system, comprising:
   a processor, configured to receive a two-dimensional image and to segment an object block in the two-dimensional image, mask the object block with a color block to generate a mask image, and input the two-dimensional image and the mask image into a first image processing model; wherein the first image processing model outputs a feature vector, and the processor inputs the two-dimensional image into a second image processing model to obtain a feature map;
   wherein the feature map comprises a plurality of feature channel maps, and the feature vector contains a plurality of feature values, each of the feature channel maps corresponds to one of the feature values in sequence, and the processor generates a weighted feature map according to the feature channel maps and the feature values;
   wherein the processor is further configured to sequentially multiply each of the feature channel maps by each of the feature values in order to output the weighted feature map.

2. The image processing system of claim 1, wherein the first image processing model is implemented by a convolutional neural network (CNN) model, the second image processing model is implemented by another convolutional neural network model.

3. The image processing system of claim 1, wherein the processor applies a scene segmentation model to separate the object block in the two-dimensional image, generates the mask image of an object, and inputs the mask image to the first image processing model.

4. The image processing system of claim 1, further comprising:
   an image capturing device, configured to capture the two-dimensional image.

5. The image processing system of claim 1, wherein the feature values represent weights of a plurality of features corresponding to the two-dimensional image, and the image processing system further comprises:
   a storage device, configured to store the feature values;
   wherein, when the processor inputs another two-dimensional image of the same field or a similar field into the second image processing model to obtain the feature map, the processor directly accesses the feature vector corresponding to the two-dimensional image in the storage device, and sequentially multiplies each of the feature values in the feature vector by each of the feature channel maps sequentially to output the weighted feature map.

6. An image processing method, comprising:
   receiving a two-dimensional image and segmenting an object block in the two-dimensional image, and masking the object block with a color block to generate a mask image;
   inputting the two-dimensional image and the mask image into a first image processing model, outputting a feature vector from the first image processing model; and inputting the two-dimensional image into a second image processing model to obtain a feature map;

wherein the feature map comprises a plurality of feature channel maps, and the feature vector contains a plurality of feature values, each of the feature channel maps corresponds to one of the feature values in sequence, and a weighted feature map is generated according to the feature channel maps and the feature values; and sequentially multiplying each of the feature channel maps by each of the feature values in order to output the weighted feature map.

7. The image processing method of claim 6, wherein the first image processing model is implemented by a convolutional neural network (CNN) model, and the second image processing model is implemented by another convolutional neural network model.

8. The image processing method of claim 6, further comprising:

applying a scene segmentation model to separate the object block in the two-dimensional image, generating the mask image of an object, and inputting the mask image to the first image processing model.

9. The image processing method of claim 6, further comprising:

capturing the two-dimensional image with an image capturing device.

10. The image processing method of claim 6, wherein the feature values represent the weights of a plurality of features corresponding to the two-dimensional image, and the image processing method further comprises:

storing the feature values in a storage device;

wherein, when another two-dimensional image of the same field or a similar field is input into the second image processing model to obtain the feature map, the feature vector corresponding to the two-dimensional image in the storage device is accessed, and each of the feature values in the feature vector is sequentially multiplied by each of the feature channel maps sequentially to output the weighted feature map.

\* \* \* \* \*